(12) United States Patent
Thomson

(10) Patent No.: US 6,571,625 B2
(45) Date of Patent: Jun. 3, 2003

(54) FLUID LEVEL SENSOR

(75) Inventor: Christopher J. Thomson, Palatine, IL (US)

(73) Assignee: ITT Fluid Technology, Upper Saddle River, NJ (US)

( * ) Notice: Subject to any disclaimer, the term of this patent is extended or adjusted under 35 U.S.C. 154(b) by 0 days.

(21) Appl. No.: 09/875,540

(22) Filed: Jun. 6, 2001

(65) Prior Publication Data

US 2002/0189346 A1 Dec. 19, 2002

(51) Int. Cl.[7] .......................... G01F 23/00; H02H 35/18; G08B 21/00
(52) U.S. Cl. .................. 73/304 C; 73/304 R; 307/118; 340/620
(58) Field of Search .......................... 73/304 R, 304 C; 430/620; 137/392; 307/118

(56) References Cited

U.S. PATENT DOCUMENTS

| | | | | |
|---|---|---|---|---|
| 3,644,885 A | * | 2/1972 | Radin | 340/59 |
| 3,665,209 A | * | 5/1972 | Webb et al. | 307/118 |
| 3,834,357 A | * | 9/1974 | Kaczmarek et al. | 122/504 |
| 3,999,148 A | * | 12/1976 | Miesterfeld | 331/143 |
| 4,019,067 A | * | 4/1977 | Gladstone | 307/118 |
| 4,027,172 A | * | 5/1977 | Hameline | 307/118 |
| 4,259,982 A | * | 4/1981 | Bartels | 137/392 |
| 4,356,406 A | * | 10/1982 | Bartels | 307/118 |
| 4,385,290 A | * | 5/1983 | Fiala | 340/620 |
| 4,390,793 A | * | 6/1983 | John | 307/118 |
| 4,678,403 A | * | 7/1987 | Rudy et al. | 417/12 |
| 5,613,398 A | * | 3/1997 | Lawson | 73/304 C |

* cited by examiner

Primary Examiner—Hezron Williams
Assistant Examiner—Katina Wilson
(74) Attorney, Agent, or Firm—Duane Morris LLP

(57) ABSTRACT

A device for sensing a level of a fluid, the device including a microcontroller and a probe coupled to the microcontroller. The microcontroller applies a given DC potential to the probe for a first period of time, measures a voltage associated with the level of the fluid to be sensed after the first period of time, and applies a reference DC potential to the probe for a second period of time.

19 Claims, 5 Drawing Sheets

FLUID LEVEL SENSOR

FIELD OF THE INVENTION

The present invention relates to fluid level sensors.

BACKGROUND OF THE INVENTION

As one can ascertain, the prior art is replete with many devices which operate to monitor a fluid level in a tank or other storage vessel. Many devices operate by means of an electromechanical switch which is activated by a float. The float rides or floats on the surface of the fluid. When the fluid reaches a given level, a switch coupled to the float is operated. These types of devices are undesirably subject to sticking in either the on or off position though.

There are other systems which utilize electrical or electronic devices to detect the level of fluid in a vessel or otherwise. For example, fluid level controls for containers such as boilers are known as shown by U.S. Pat. No. 3,834,357 issued Sep. 10, 1974 to L. Kaczmarek et al. Conductance probe controls detect a level of a conductive media, such as a fluid, by passing an electrical current through a probe, into the conductive media and then back to a controller. The probe is at least partially immersed in the fluid when the fluid is at certain levels and not in contact with the fluid when the fluid is at lower levels. The controller measures the received current level to determine whether the probe is in contact with the media, i.e. whether a fluid is at or above a certain level. Such devices conventionally utilize AC currents, as applying a constant DC current to a probe exposed to a conductive fluid can undesirably promote probe deterioration. However, a drawback of using AC is that it requires the inclusion of support circuitry when also using a conventional microcontroller. This increases the cost and complexity of such a device.

To promote safety, probe excitation should also be limited to safe levels. Level control circuits in which the electrical path through an electrode or probe is at a low AC level such as 24 VAC is shown by U.S. Pat. No. 4,019,067 issued Apr. 19, 1977 to R. Gladstone.

It is an object of the present invention to provide a cost efficient fluid level sensor which overcomes these limitations of the prior art and yet allows for a sufficiently low probe excitation potential so as not to create an unnecessary safety risk.

SUMMARY OF INVENTION

A device for sensing a level of a fluid, the device including: a microcontroller; a probe coupled to the microcontroller; and a plurality of instructions for use by the microcontroller to apply a given DC potential to the probe for a first period of time, measure a voltage associated with the level of the fluid to be sensed after the first period of time, and apply a reference DC potential to the probe for a second period of time.

BRIEF DESCRIPTION OF THE FIGURES

Various other objects, features and advantages of the invention will become more apparent by reading the following detailed description of the invention in conjunction with the drawings, which are shown by way of example only, wherein.

DETAILED DESCRIPTION OF THE PREFERRED EMBODIMENT

According to the present invention in general, a microcontroller applies a DC pulse having a short duration to a probe through a capacitive circuit. The DC pulse charges the capacitive circuit, which is then measured to determine whether a media, such as a fluid, is present at the probe. The charged circuit discharges through the probe and microcontroller. Due to this pulsing and the capacitive property of the circuit, the applied DC current appears on the probe as an AC current. Accordingly, probe deterioration is advantageously averted. Further, since a DC voltage is used a microcontroller or microprocessor can be advantageously used to operate the device without a need for any additional components to support or provide an AC stimulus to the probe.

Figure 1A:
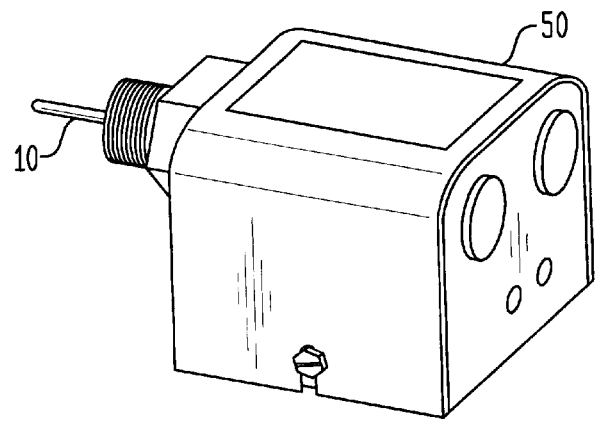
FIGS. 1A and 1B illustrate perspective views of an assembly according to an aspect of the present invention.
Figure 1B:
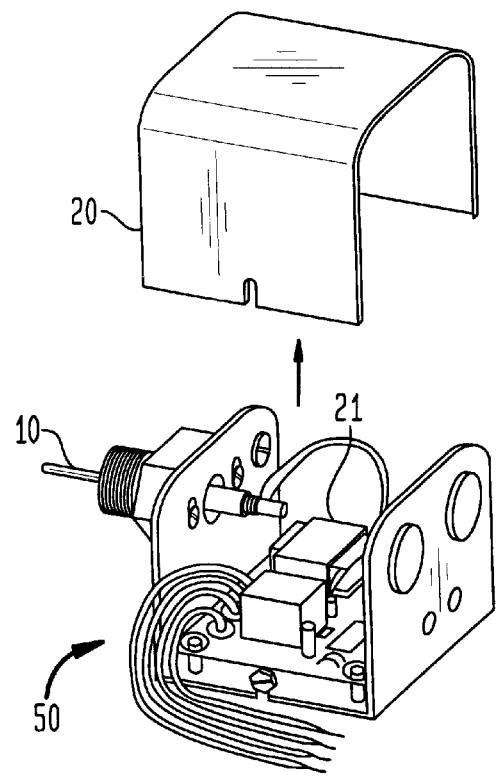

Referring now to the figures, FIGS. 1A and 1B illustrate perspective views of a level sensing device assembly 50 according to an aspect of the present invention. Generally, the assembly 50 includes a probe 10 and housing 20. Within the housing 20 is secured a circuit board 21.

Figure 2:
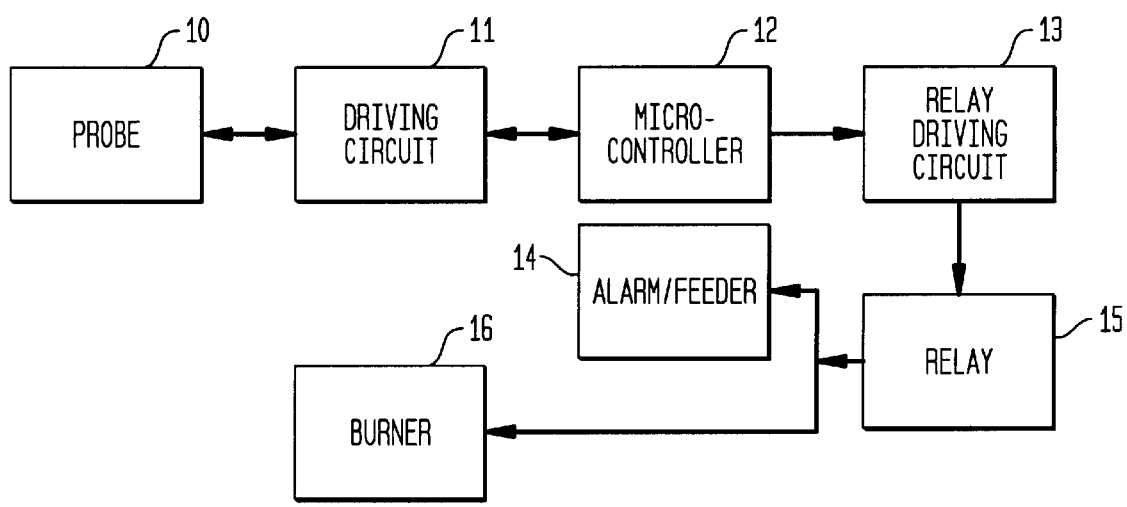
FIG. 2 illustrates a functional block diagram of a fluid level sensing system according to an aspect of the present invention.

Referring now also to FIG. 2, the circuit board 21 includes a driving circuit 11 and microcontroller 12. Optionally, the assembly 50 may further include a relay driving circuit 13 and relay 15 which can be used to activate an alarm or other feeder circuit 14 or burner control circuit 16, for example. The use of alarms and burner controls have long been used in connection with fluid level sensors. The probe 10 is interconnected with the driving circuit 11. The microcontroller 12 is interconnected with the driving circuit 11. The microcontroller 12 is also interconnected with relay driving circuit 13. The relay driving circuit in turn is interconnected with and activates relay 15, which is in turn interconnected with and activates an alarm or feeder circuit 14 or burner control circuit 16, for example.

Figure 3:
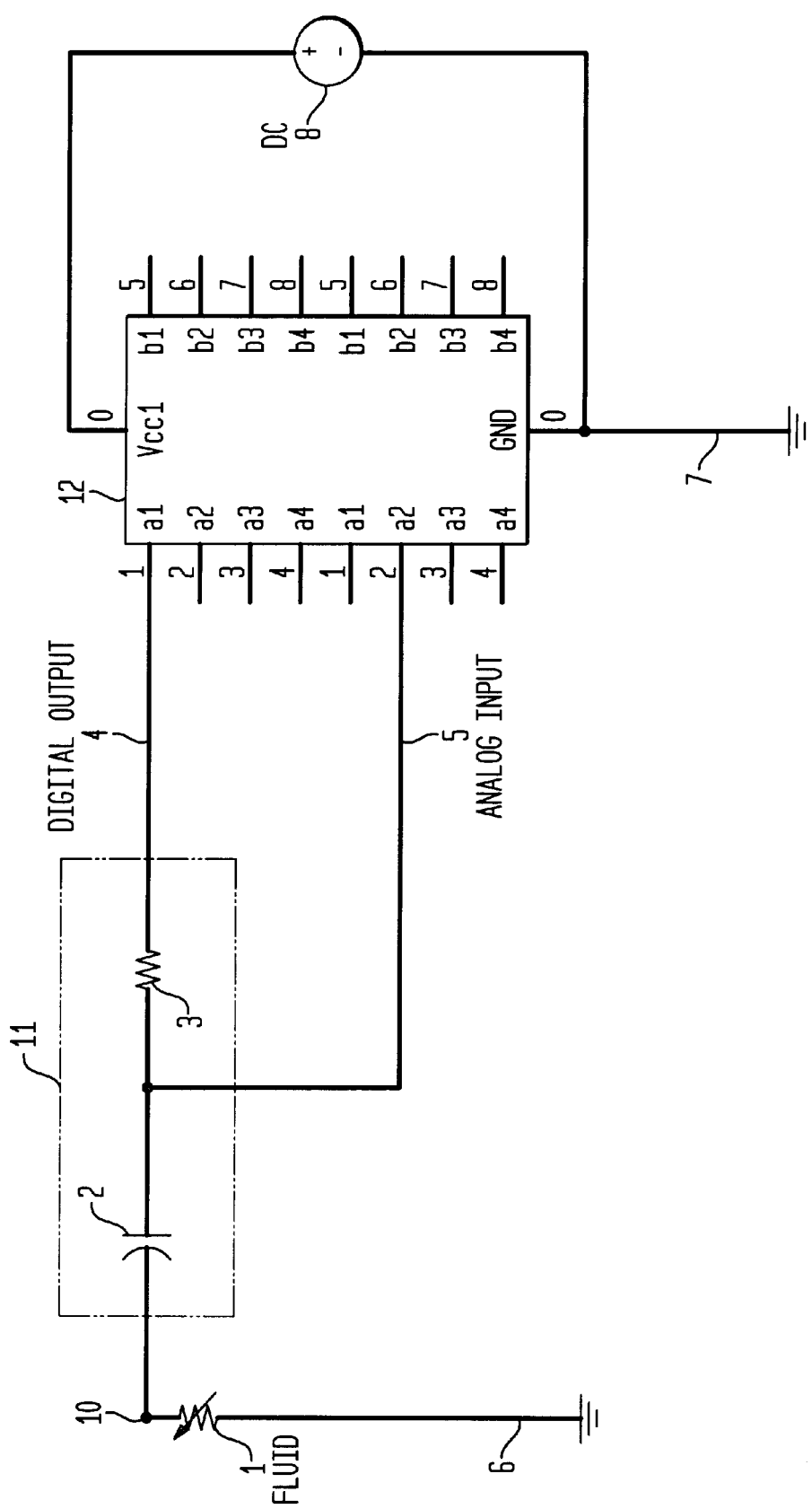
FIG. 3 illustrates a circuit schematic according to an aspect of the present invention.

Referring now also to FIG. 3, there is shown a schematic according to yet another aspect of the present invention. The microcontroller 12 preferably includes at least one digital output 4 and analog input 5 as are conventionally understood. The microcontroller 12 is preferably operated using a conventional DC power supply 8 and is connected to ground 7. As is well understood, microcontrollers are programmable. They utilize programs which take the form of a plurality of instructions stored in memory. This memory can be either internal or external to the microcontroller. The microcontroller 12, using a suitable program, compares the voltage input via the analog input 5 with predetermined voltage levels, to determine whether fluid is present at or above the level of the probe 10.

The driving circuit 11 preferably includes at least one resistive device 3 and one capacitive device 2 coupled in series between the digital output 4 of the microcontroller 12 and probe 10. The analog input 5 is preferably coupled to a common node between the resistive device 3 and capacitive device 2. The resistive device 3 preferably takes the form of a resistor and the capacitive device 2 preferably takes the form of a capacitor. Of course, other types of devices exhibiting resistive and capacitive characteristics, respectively, can be used though. The resistor 3 is preferably coupled to the digital output 4 while the capacitor 2 is preferably coupled to the probe 10.

Operation of the device according to an aspect of the present invention will be described with further reference to FIG. 3 for sake of clarity. The microcontroller 12 activates the digital output 4 thus applying a given potential to the probe 10 through resistor 3 and capacitor 2. The resistive device 3 acts as a current limiting device to prevent damage due to excessive currents. When the given potential is applied by activating the digital output 4, the capacitive device 2 begins to charge, thus building a voltage. A potential is also applied across the fluid to have its level measured, which is illustrated as variable resistor 1 in FIG. 3, to the probe ground 6. The charging rate of the capacitive device 2 is limited by the resistance of the fluid 1. The resistance of the fluid 1 is dependent upon the level of the fluid 1 as is well understood.

After a predetermined period of time, the charge on and hence voltage built by the capacitive device 2 is input to the microprocessor via analog input 5. The microcontroller then deactivates the digital output 4 thus biasing the digital output 4 to a second given potential, i.e. a reference potential. Preferably the first given potential applied when the digital output 4 was activated by the microcontroller 12 is greater, i.e. it goes high, than the second given potential applied when the digital output is deactivated by the microcontroller, i.e. it goes low. The low digital output 4 facilitates discharging through the microcontroller 12 and ground 6.

Referring again to FIG. 2 as well, based upon this determination, the microcontroller 12 can activate or deactivate relay driving circuit 13 which in turn activates or deactivates relay 15 using conventional techniques.

Figure 4:
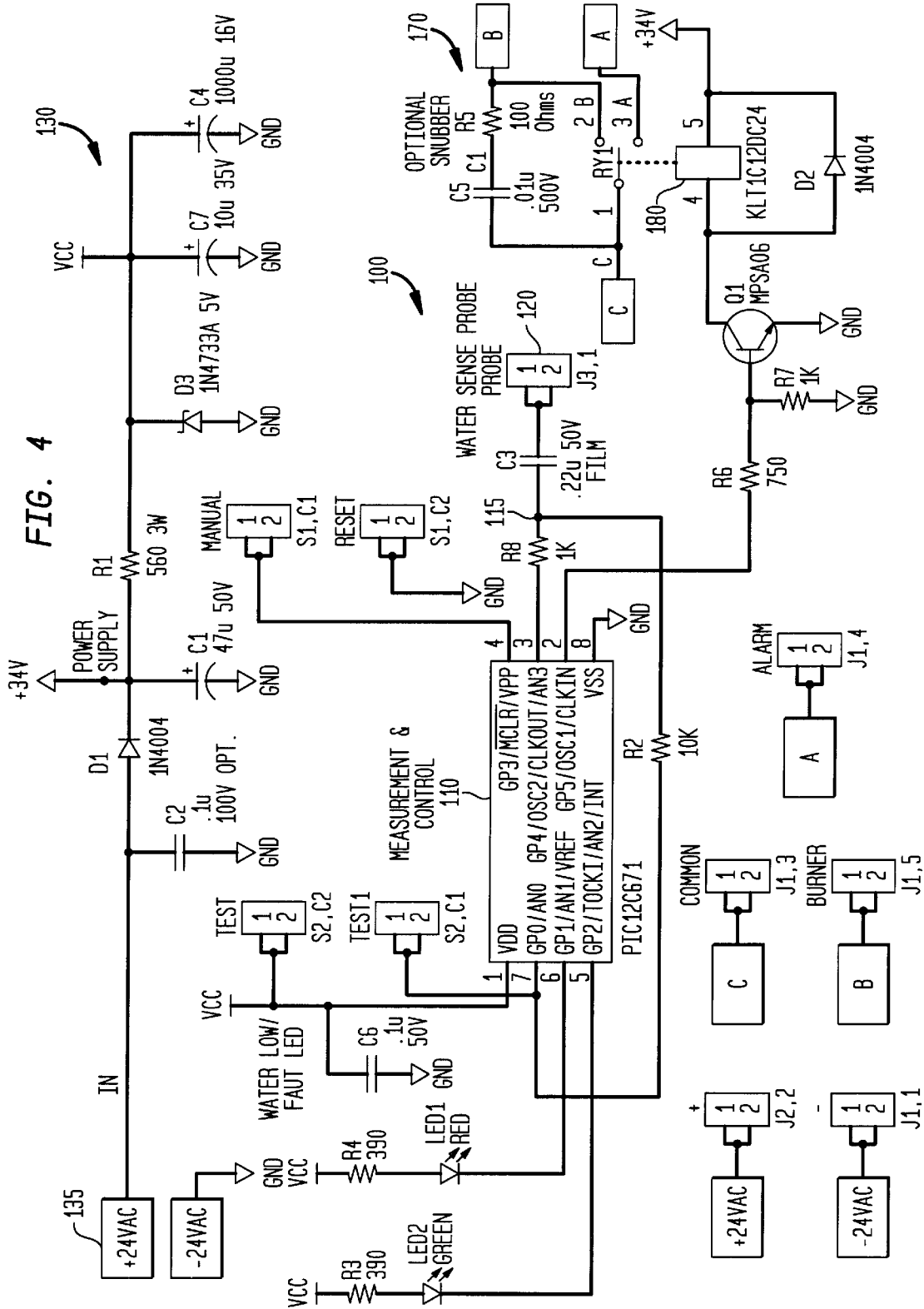
FIG. 4 illustrates a circuit schematic according to another aspect of the present invention; and, FIG. 5 illustrates the response of the circuit of FIG. 4 corresponding to various probe resistances.

Referring now to FIG. 4, there is shown a system circuit 100 schematic according to another aspect of the present invention. The circuit 100 includes a microcontroller 110, such as a PIC126C671 microcontroller commercially available from Microchip Technology, Inc. of Chandler, Ariz. The microcontroller 110 has a digital output 3 and analog input 7. The digital output 3 is coupled to probe connectors 120 through serially coupled resistor R8 and capacitor C3. Probe connector 120 is connected to a probe such as that shown in FIG. 3. Resistor R8, in the exemplary embodiment shown, has a value of 1 KΩ, while capacitor C3 has a value of 0.22 μF. Analog input 7 is coupled via resistor R2 to a common node 115 between resistor R8 and capacitor C3. In the same exemplary embodiment, resistor R2 has a value of 10 KΩ. Microcontroller 110 is provided with an operating voltage VCC and reference potential using connectors 1 and 8, respectively. Connector 1 is further preferably coupled to ground via a capacitor C6. Capacitor C6 in the exemplary embodiment has a value of 0.1 μF.

Referring still to FIG. 4, operating voltage VCC is supplied using supply circuit 130. Supply circuit 130 receives an AC input 135, which in the exemplary case shown is 24 VAC. Input 135 is coupled via a capacitor C2 to ground. Input 135 is also coupled via forward-biased diode D1 to resistor R1. Also coupled between diode D1 and resistor R1 is a capacitor C1 further coupled to ground. Coupled to the resistor R1 is a zener diode voltage regulator D3 further coupled to ground. Coupled to the resistor R1 and zener diode D3 is a VCC supply junction which is further coupled to ground in parallel via capacitors C7 and C4, respectively. In the shown exemplary embodiment capacitor C2 has a value of 1 μF, C1 has a value of 47 μF, C7 has a value of 10 μF and C4 has a value of 1000 μF. Diode D1 can take the form of a rectifier such as that designated as part no. 1N4004 available from General Semiconductor, Inc. of Melville, N.Y. Further, voltage regulating diode D3 is a zener diode such as that designated as part no. 1N4733A available from Microsemi Corp. of Scottsdale, Ariz.

Still referring to FIG. 4, VCC is also supplied via current limiting resistor R3 and Light Emitting Diode (LED) LED2 to connector 5 of microcontroller 110 and to connector 6 of microcontroller 110 via current limiting resistor R4 and LED1. LED1 is activated to indicate an alarm condition, while LED2 is activated to indicate operation via suitable programming of the microcontroller 110, for example.

Still referring to FIG. 4, coupled to a connector 2 of the microcontroller 110, via a resistor R6, is the base electrode of a transistor Q1. The same base electrode is also coupled to ground via a resistor R7. The collector electrode of the transistor Q1 is coupled in parallel to diode D1, capacitor C1 and resistor R1 of the supply circuit 130 via a relay 180 and diode D2. The relay 180 is responsive to a snubber circuit 170. In the exemplary embodiment, resistor R6 has a value of 10 KΩ and R7 has a value of 1 KΩ. Transistor Q1 is an amplifier such a that designated part no. MPSA06 available from Fairchild Semiconductor of South Portland, Me. Diode D2 is analogous to the aforementioned diode D1. Snubber circuit 170 is used to reduce kickbacks due to inductive load switching associated with a burner or alarm circuits of FIG. 2 for example.

Referring still to FIG. 4, the water resistance threshold for the circuit thereof is approximately 7 K ohms, but could range from 4 K to 100 K, for example. If the sensitivity range is changed the values of the C3 capacitor and the R2 resistor can be changed to optimize resolution of the return signal on connector 7. The voltage level on connector 7 can range from 0–5 VDC, for example. The probe is stimulated with a 5 VDC signal pulse, for example.

Figure 5:
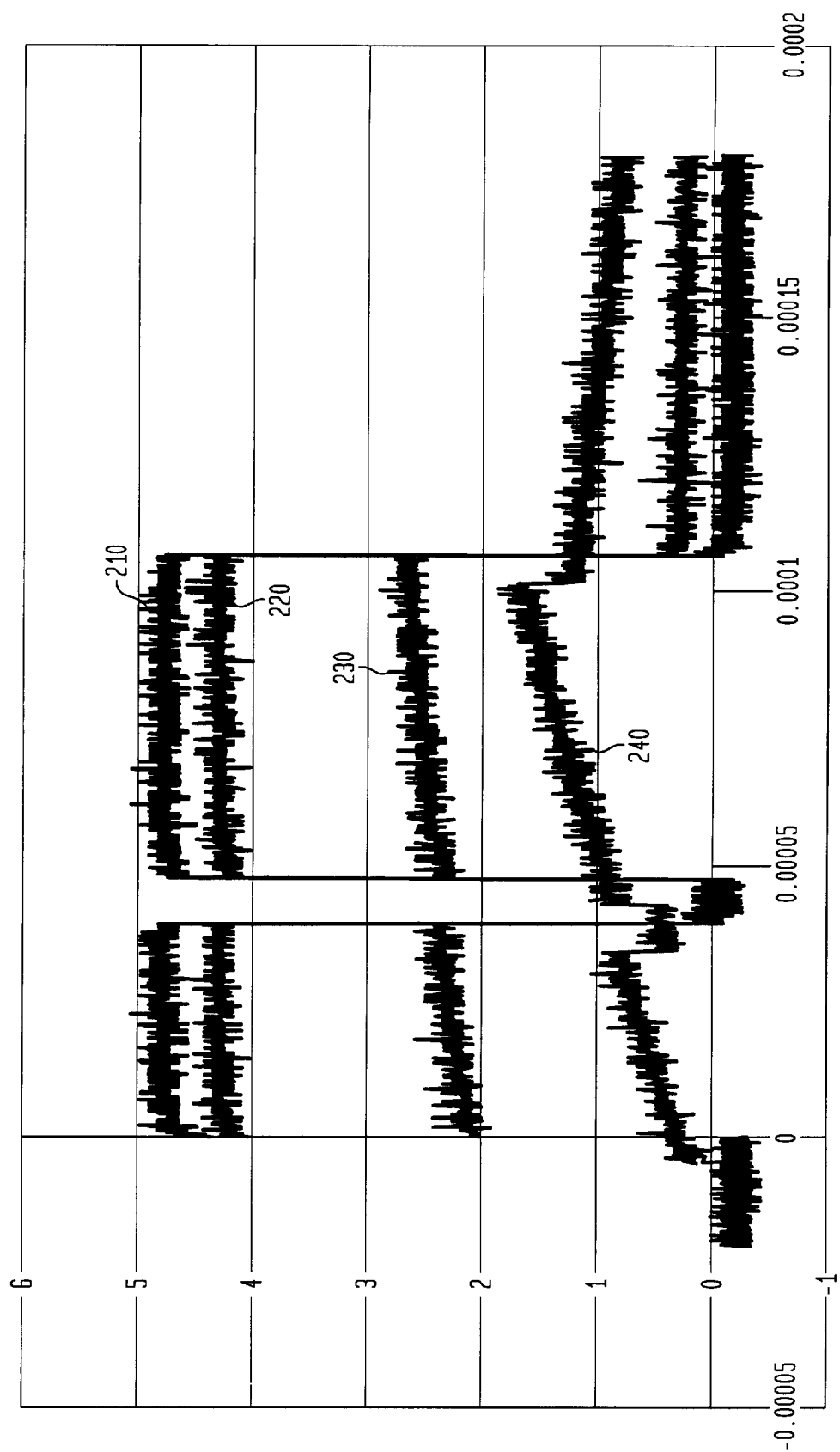

Referring now to FIG. 5, there shown the response of the circuit of FIG. 4 corresponding to various probe resistances. Track 210 corresponds to an open circuit condition for the probe. Track 220 corresponds to the probe being subjected to a 10 KΩ resistance through the fluid being measured. Track 230 corresponds to the probe being subjected to a 1 KΩ resistance through the fluid being measured. And, track 240 corresponds to the probe being subjected to a 100 Ω resistance through the fluid being measured. The sole appendix attached hereto illustrates voltage levels corresponding to tracks 210–240.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. A device for sensing a level of a fluid, said device comprising:
    a microcontroller;
    a probe coupled to said microcontroller; and
    a plurality of instructions for use by said microcontroller to apply a given DC potential to said probe for a first period of time, measure a voltage associated with said level of said fluid to be sensed after said first period of time, and apply a reference DC potential to said probe for a second period of time.

2. The device of claim 1, wherein said microcontroller comprises a digital output and said probe is coupled to said digital output.

3. The device of claim 2, wherein said microcontroller biases said digital output to first and second states, and said first state corresponds to said given DC potential and said second state corresponds to said reference DC potential.

4. The device of claim 3, wherein said given DC potential is approximately 5 volts.

5. The device of claim 3, wherein said reference DC potential is approximately equivalent to ground.

6. The device of claim 1, wherein said driving circuit comprises at least one capacitive device.

7. The device of claim 6, wherein said driving circuit further comprises at least one resistive device.

8. The device of claim 7, wherein said microcontroller comprises an analog input coupled between said resistive device and capacitive device for measuring said voltage associated with said level of said fluid to be sensed.

9. The device of claim 1, wherein said given DC potential is greater than said reference DC potential.

10. The device of claim 1, further comprising a driving circuit serially coupled between said probe and said microcontroller.

11. The device of claim 1, further comprising a plurality of memory locations accessible by said microcontroller and for storing data for comparing against said measured voltage.

12. The device of claim 1, wherein said plurality of instructions is stored in a plurality of memory locations.

13. A fluid level sensing device comprising:
   a computing processor;
   a probe;
   a plurality of memory locations being accessible by said processor and storing a plurality of instructions operable to pulse said probe with a given DC potential and measure a voltage associated with a fluid level to be sensed at predetermined times with respect to said pulsing;
   an output controlled by said processor to achieve first and second states; a resistive device; and, a capacitive device; wherein said resistive and capacitive devices are coupled in series between said output and said probe, and said voltage to be measured is associated with said capacitive device and is responsive to said pulsing.

14. The device of claim 13, further comprising an analog input coupled to said processor and to a common node between said resistive device and capacitive device for receiving said voltage to be measured.

15. A method for operating a fluid level sensor comprising a microcontroller including an analog input and a digital output, and a probe coupled to said microcontroller, said method comprising:
   activating said digital output thereby applying a given DC potential to said probe;
   measuring a voltage indicative of said fluid level to be sensed using said analog input; and,
   deactivating said digital output thereby applying a reference DC potential to said probe.

16. The method of claim 15, wherein said activating said digital output causes a buildup of said voltage indicative of said fluid level to be sensed.

17. The method of claim 16, wherein said deactivating said digital output causes said built-up voltage indicative of said fluid level to be sensed to diminish.

18. The method of claim 17, further comprising comparing said measured voltage to at least one predetermined value.

19. The method of claim 15, further comprising selectively activating at least one relay dependently upon said comparing.

* * * * *